(12) United States Patent
Hwang et al.

(10) Patent No.: US 7,023,145 B2
(45) Date of Patent: Apr. 4, 2006

(54) BACKLIGHT INVERTER FOR U-SHAPED LAMP

(75) Inventors: Jung Won Hwang, Suwon (KR); Ju Rae Kim, Suwon (KR); Ho Young Kim, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/965,264

(22) Filed: Oct. 15, 2004

(65) Prior Publication Data

US 2006/0043909 A1    Mar. 2, 2006

(30) Foreign Application Priority Data

Aug. 27, 2004    (KR) ...................... 10-2004-0067845

(51) Int. Cl.
*H05B 41/16*    (2006.01)

(52) U.S. Cl. ...................... 315/276; 315/219; 315/244; 315/247; 345/102; 345/87

(58) Field of Classification Search ................. 315/276
See application file for complete search history.

(56) References Cited

U.S. PATENT DOCUMENTS

| 5,280,333 | A | * | 1/1994 | Wunderer ..................... 356/71 |
| 5,650,925 | A | * | 7/1997 | Hesterman ................... 363/132 |
| 6,919,693 | B1 | * | 7/2005 | Fushimi ...................... 315/219 |
| 2003/0071584 | A1 | * | 4/2003 | Lee et al. |
| 2004/0051692 | A1 | * | 3/2004 | Hirakata ey al. ........... 345/102 |
| 2004/0066149 | A1 | * | 4/2004 | Gray .......................... 315/244 |

* cited by examiner

*Primary Examiner*—Trinh V Dinh
*Assistant Examiner*—Binh Van Ho
(74) *Attorney, Agent, or Firm*—Lowe Hauptman & Berner, LLP

(57) ABSTRACT

Disclosed herein is a backlight inverter for a U-shaped lamp which is capable of detecting an abnormal state of an inverter circuit. The backlight inverter comprises a driver for supplying first and second transformer drive voltages in response to an operation control signal and cutting off the supply of the transformer drive voltages in response to a shutdown control signal, first and second transformers for boosting the transformer drive voltage in a turn ratio between primary and secondary windings thereof and supplying the resulting drive voltage to the U-shaped lamp, first and second voltage detectors for detecting voltages across the secondary windings, respectively, first and second current detectors for detecting currents flowing through the secondary windings of the first and second transformers, respectively, an inverter abnormal state detector for detecting an abnormal state of the inverter, and a driver controller for controlling a normal operation or shutdown of the driver.

11 Claims, 3 Drawing Sheets

BACKLIGHT INVERTER FOR U-SHAPED LAMP

RELATED APPLICATIONS

The present application is based on, and claims priority from, Korean Application Number 2004-67845, filed Aug. 27, 2004, the disclosure of which is incorporated by reference herein in its entirety.

BACKGROUND OF THE INVENTION

1. Field of the Invention

The present invention relates to a backlight inverter which is applied to a U-shaped lamp, and more particularly to a backlight inverter for a U-shaped lamp which is capable of detecting an abnormal state of an inverter circuit, such as an opened or shorted state of the inverter circuit and/or lamp, breaking or arcing of the lamp, or etc., and shutting down the inverter circuit upon detecting the abnormal state thereof, so as to enhance operational reliability thereof.

2. Description of the Related Art

A backlight inverter is generally adapted to convert a low direct current (DC) voltage into an alternating current (AC) voltage and reconvert the AC voltage into a high voltage using a transformer to light a lamp. Since the backlight inverter induces the high voltage in an output terminal thereof, it must be shut down upon being touched by a person, so as to inflict no bodily injury on the person. The inverter also has separate specifications on safety standards.

Lamps for backlighting can be roughly classified into a linear lamp which has been traditionally used and a U-shaped lamp, the use of which has gradually increased.

One example of a backlight inverter for a linear lamp will hereinafter be described with reference to FIG. 1.

FIG. 1 is a schematic view of a conventional backlight inverter for a linear lamp.

As shown in FIG. 1, the conventional backlight inverter for the linear lamp, denoted by reference numeral 10, a transformer driver 11 for converting an input DC voltage into an AC voltage in response to a control signal, a transformer 12 for boosting the AC voltage converted by the transformer driver 11 to a high voltage of about 1 to 2 kV required to drive the lamp and supplying the boosted high voltage to the lamp, a current detector 13 for detecting current Is flowing through the lamp, and a driver controller 14 for detecting a shorted or opened state of an output terminal of the inverter according to the current detected by the current detector 13 and controlling shutdown of the driver 11 upon detecting the shorted or opened state.

The current detector 13 includes a resistor R connected to a cold terminal of the lamp, and acts to detect current corresponding to a voltage across the resistor R.

This conventional backlight inverter is operated in the following manner. Under the condition that the lamp is normally connected, the lamp is normally lighted, the detected current is applied to the driver controller 14 and the output voltage of the inverter is constantly maintained.

However, when there occurs an abnormal state of the inverter such as an opened or shorted state of a hot or cold terminal of the lamp, the inverter is shut down. For example, in the case where the output terminal of the backlight inverter is opened, no current flows through the lamp, so the detected current Is becomes "0". As a result, the driver controller shuts down the inverter.

On the other hand, in the case where the output terminal of the backlight inverter is shorted to ground, the detected current Is becomes "0" because the output terminal is connected to the ground. As a result, the driver controller shuts down the inverter.

In the conventional backlight inverter applied to the linear lamp, as mentioned above, the detected current Is becomes "0" in either the opened state or shorted state of the hot or cold terminal of the lamp, and the backlight inverter can be shut down by sensing the detected current Is.

Meanwhile, a U-shaped lamp is recently being researched and developed for application as a lamp for backlighting owing to the advantage of being superior in efficiency to the linear lamp.

Since the U-shaped lamp is about twice as long as the linear lamp, a drive voltage which is about twice as high as that for the linear lamp is required to drive the U-shaped lamp. For example, the drive voltage is about 1300V for a 17-inch linear lamp and about 2650V for a 17-inch U-shaped lamp.

In this connection, when a conventional backlight inverter using one transformer is applied to drive the U-shaped lamp, the transformer must have a high withstand voltage, thereby making it difficult to drive the U-shaped lamp using such one transformer.

Accordingly, two transformers must be used to drive the U-shaped lamp and, in order to stably operate the U-shaped lamp using such two transformers, there is a need for a new scheme for detection of inverter abnormal states different from that applied to the backlight inverter using one transformer.

SUMMARY OF THE INVENTION

Therefore, the present invention has been made in view of the above problems, and it is an object of the present invention to provide a backlight inverter for a U-shaped lamp which is capable of detecting an abnormal state of an inverter circuit, such as an opened or shorted state of the inverter circuit and/or lamp, breaking or arcing of the lamp, or etc., and shutting down the inverter circuit upon detecting the abnormal state thereof, so as to enhance operational reliability thereof.

In accordance with the present invention, the above and other objects can be accomplished by the provision of a backlight inverter for a U-shaped lamp, comprising: a driver for supplying first and second transformer drive voltages in response to an operation control signal and cutting off the supply of the transformer drive voltages in response to a shutdown control signal; a first transformer for boosting the first transformer drive voltage from the driver in a turn ratio between primary and secondary windings thereof and supplying the resulting first drive voltage to one end of the U-shaped lamp; a second transformer for boosting the second transformer drive voltage from the driver in a turn ratio between primary and secondary windings thereof and supplying the resulting second drive voltage to the other end of the U-shaped lamp; first and second voltage detectors for detecting voltages across the secondary windings of the first and second transformers, respectively; first and second current detectors for detecting currents flowing through the secondary windings of the first and second transformers, respectively; an inverter abnormal state detector for detecting an abnormal state of the inverter on the basis of each of the detected voltages from the first and second voltage detectors, and cutting off output of each of the detected currents from the first and second current detectors upon detecting the abnormal state of the inverter and providing each of the detected currents from the first and second current detectors as output current upon detecting no abnormal state of the inverter; and a driver controller for providing the operation control signal to the driver to control a normal operation thereof, upon receiving the output current from the inverter abnormal state detector, and providing the shutdown control signal to the driver upon receiving no current from the inverter abnormal state detector.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
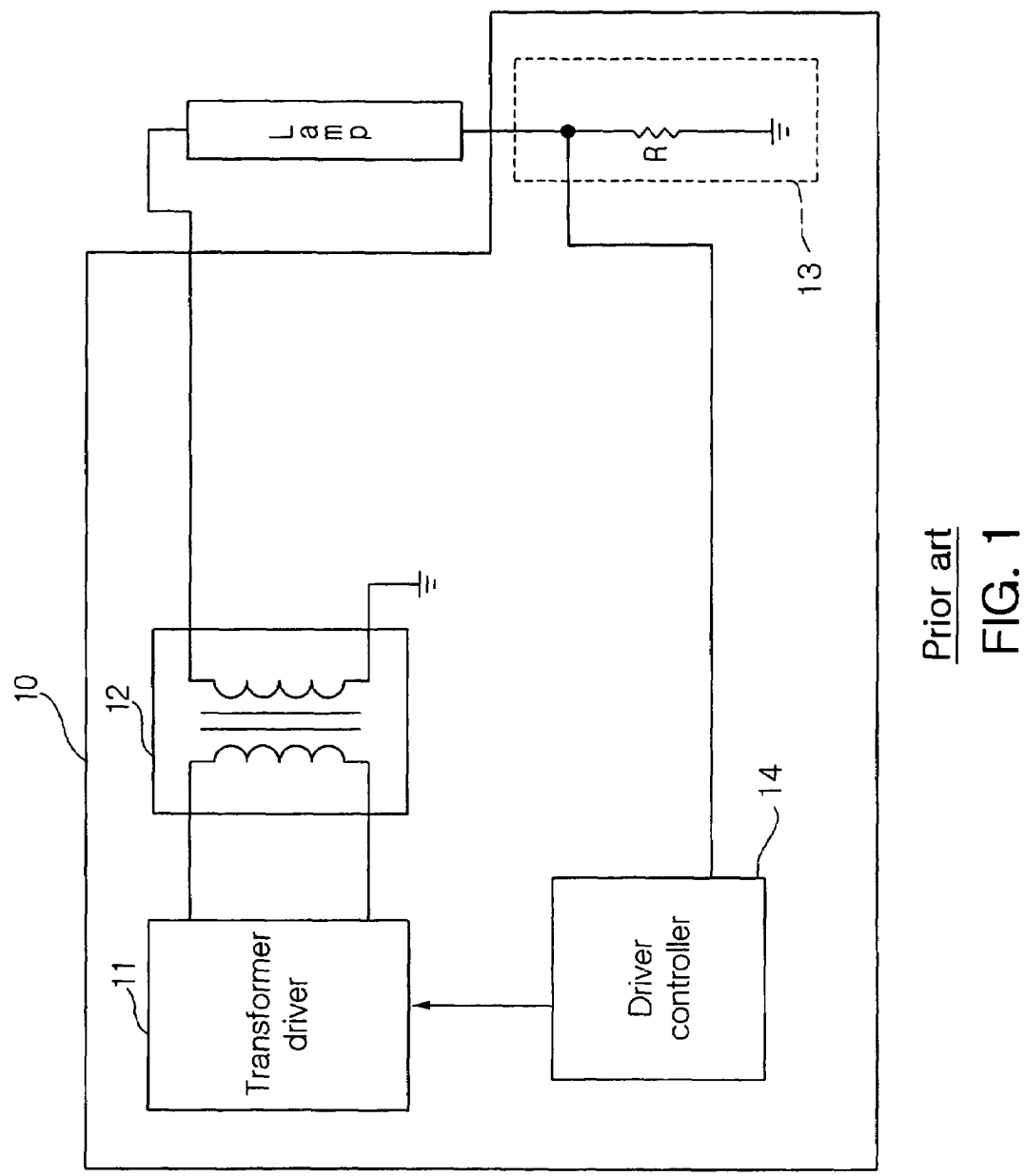
FIG. 1 is a schematic view of a conventional backlight inverter for a linear lamp.

Now, preferred embodiments of the present invention will be described in detail with reference to the annexed drawings. In the drawings, the same or similar elements are denoted by the same reference numerals even though they are depicted in different drawings.

Figure 2:
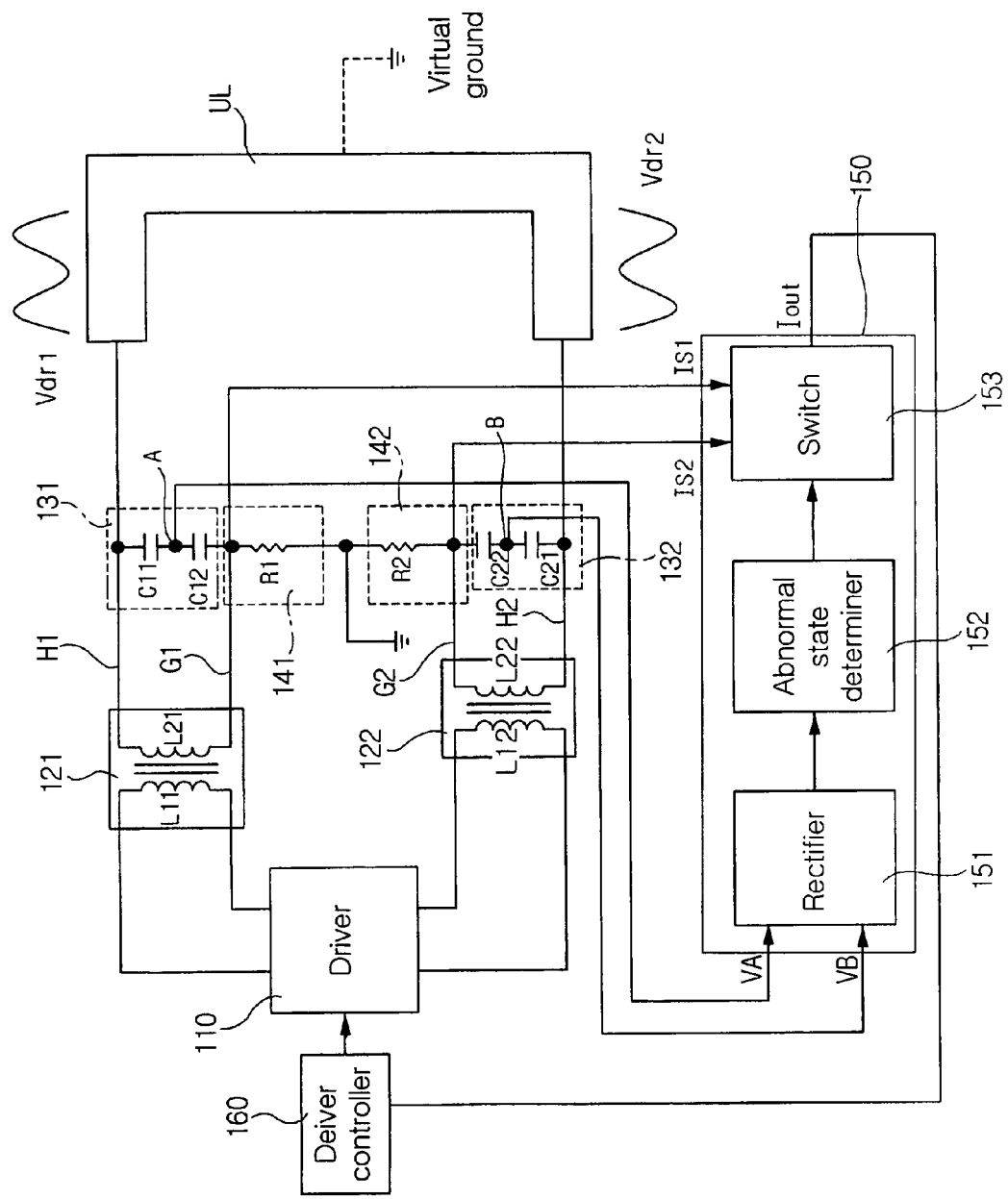
FIG. 2 is a view showing the configuration of a backlight inverter for a U-shaped lamp according to the present invention.

FIG. 2 shows the configuration of a backlight inverter for a U-shaped lamp according to the present invention.

With reference to FIG. 2, the backlight inverter for the U-shaped lamp according to the present invention comprises a driver 110, first and second transformers 121 and 122, first and second voltage detectors 131 and 132, first and second current detectors 141 and 142, an inverter abnormal state detector 150, and a driver controller 160.

The driver 110 is adapted to supply first and second transformer drive voltages in response to an operation control signal from the driver controller 160 and cut off the supply of the transformer drive voltages in response to a shutdown control signal from the driver controller 160.

The first transformer 121 is adapted to boost the first transformer drive voltage from the driver 110 in a turn ratio between primary and secondary windings L11 and L21 thereof and supply the resulting first drive voltage Vdr1 to one end of the U-shaped lamp UL. The second transformer 122 is adapted to boost the second transformer drive voltage from the driver 110 in a turn ratio between primary and secondary windings L12 and L22 thereof and supply the resulting second drive voltage Vdr2 to the other end of the U-shaped lamp UL.

The first voltage detector 131 is adapted to detect a voltage VA across the secondary winding L21 of the first transformer 121. To this end, the first voltage detector 131 includes two capacitors C11 and C12 connected in series between a high voltage terminal H1 of the secondary winding L21 of the first transformer 121 and a ground terminal G1 thereof. The capacitors C11 and C12 cooperate to detect the voltage VA across the secondary winding L21 of the first transformer 121 at a connection point A thereof.

The second voltage detector 132 is adapted to detect a voltage VB across the secondary winding L22 of the second transformer 122. To this end, the second voltage detector 132 includes two capacitors C21 and C22 connected in series between a high voltage terminal H2 of the secondary winding L22 of the second transformer 122 and a ground terminal G2 thereof. The capacitors C21 and C22 cooperate to detect the voltage VB across the secondary winding L22 of the second transformer 122 at a connection point B thereof.

The first current detector 141 is adapted to detect current IS1 flowing through the secondary winding L21 of the first transformer 121. To this end, the first current detector 141 includes a resistor R1 connected between the ground terminal G1 of the secondary winding L21 of the first transformer 121 and ground. The resistor R1 acts to detect the current IS1 flowing through the secondary winding L21 of the first transformer 121 at the ground terminal G1 thereof.

The second current detector 142 is adapted to detect current IS2 flowing through the secondary winding L22 of the second transformer 122. To this end, the second current detector 142 includes a resistor R2 connected between the ground terminal G2 of the secondary winding L22 of the second transformer 122 and the ground. The resistor R2 acts to detect the current IS2 flowing through the secondary winding L22 of the second transformer 122 at the ground terminal G2 thereof.

The inverter abnormal state detector 150 is adapted to detect an abnormal state of the inverter on the basis of each of the detected voltages VA and VB from the first and second voltage detectors 131 and 132, and cut off the output of each of the detected currents IS1 and IS2 from the first and second current detectors 141 and 142 upon detecting the abnormal state of the inverter and provide each of the detected currents IS1 and IS2 from the first and second current detectors 141 and 142 as output current Iout upon detecting no abnormal state of the inverter.

To this end, the inverter abnormal state detector 150 includes a rectifier 151 for rectifying each of the detected voltages VA and VB from the first and second voltage detectors 131 and 132, an abnormal state determiner 152 for comparing an output voltage VD from the rectifier 151 with a predetermined abnormal state determination voltage Vref to determine whether the inverter is in the abnormal state, and a switch 153 for switching the output of each of the detected currents IS1 and IS2 from the first and second current detectors 141 and 142 according to a result of the abnormal state determination by the abnormal state determiner 152.

That is, the switch 153 acts to cut off the output of each of the detected currents IS1 and IS2 from the first and second current detectors 141 and 142 if the inverter is in the abnormal state and provide each of the detected currents IS1 and IS2 from the first and second current detectors 141 and 142 as the output current Iout to the driver controller 160 if the inverter is not in the abnormal state.

The driver controller 160 is adapted to provide the operation control signal to the driver 110 to control the normal operation thereof, upon receiving the output current Iout from the inverter abnormal state detector 150, and provide the shutdown control signal to the driver 110 upon receiving no current from the inverter abnormal state detector 150. When the output current Iout is not inputted, namely, when it has a ground level, the driver controller 160 determines the inverter to be in the abnormal state and then provides the shutdown control signal to the driver 110. When the output current Iout is inputted, the driver controller 160 determines the inverter not to be in the abnormal state and then provides the operation control signal to the driver 110 so that the inverter can continuously output a voltage of a desired level.

Figure 3:
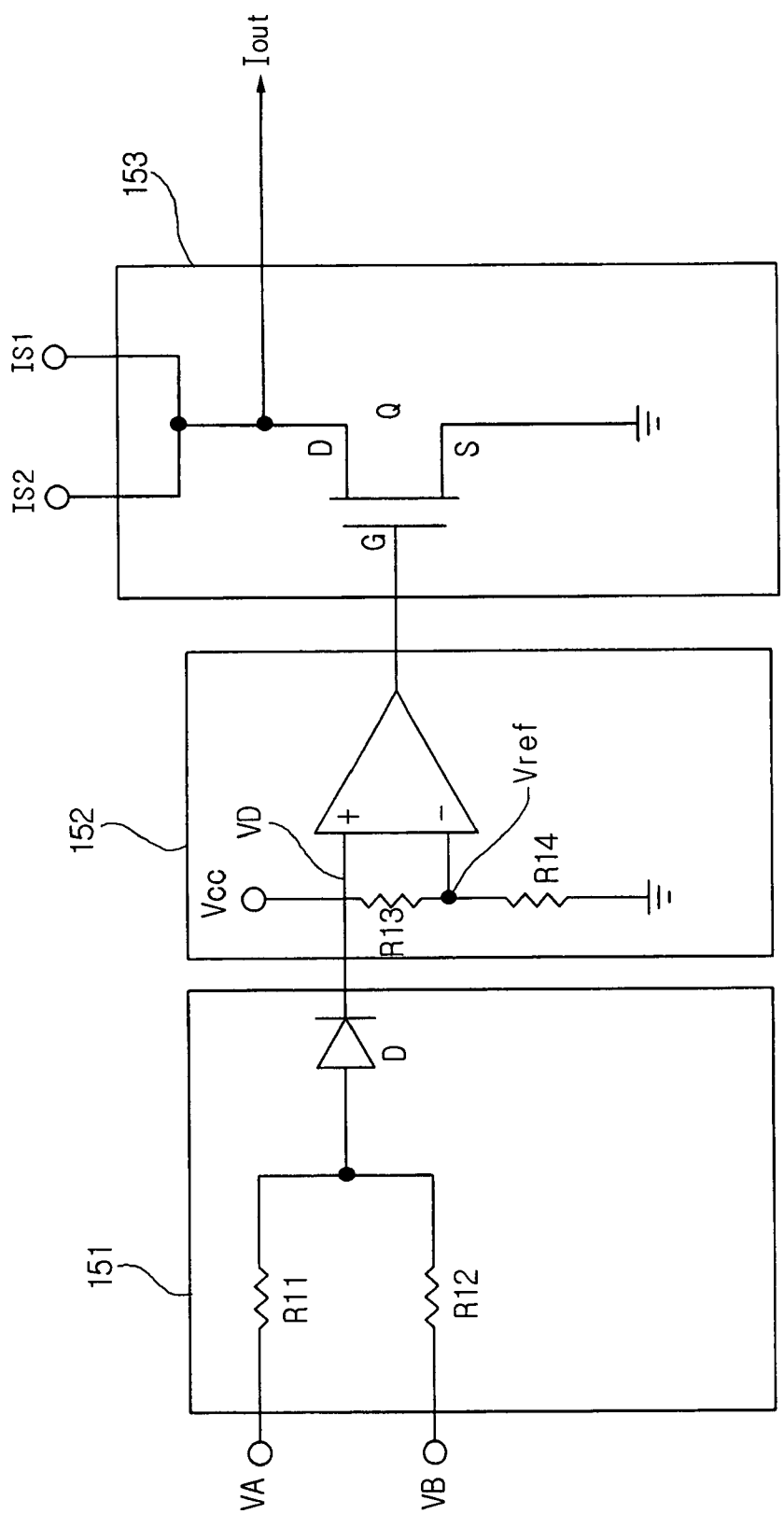
FIG. 3 is a circuit diagram of an inverter abnormal state detector in FIG. 2.

FIG. 3 is a circuit diagram of the inverter abnormal state detector 150 in FIG. 2.

With reference to FIG. 3, the rectifier 151 of the inverter abnormal state detector 150 includes a first input resistor R11 having one end connected to an output terminal of the first voltage detector 131, a second input resistor R12 having one end connected to an output terminal of the second voltage detector 132, and a rectification diode D having an anode connected in common to the other ends of the first and second input resistors R11 and R12 and a cathode connected to an input terminal of the abnormal state determiner 152.

The abnormal state determiner 152 of the inverter abnormal state detector 150 includes a comparator having a non-inverting input terminal for receiving the output voltage VD from the rectifier 151, an inverting input terminal for receiving the predetermined abnormal state determination voltage Vref, and an output terminal for outputting a high voltage if the voltage VD is higher than the abnormal state determination voltage Vref and a low voltage if the voltage VD is not higher than the abnormal state determination voltage Vref.

Preferably, the abnormal state determination voltage Vref in the abnormal state determiner 152 is set to any value between the output voltage VD from the rectifier 151 in the normal state of the inverter and that in the abnormal state of the inverter.

The switch 153 of the inverter abnormal state detector 150 includes a switching element connected between a common connection point of output terminals of the first and second current detectors 141 and 142 and the ground. The switching element acts to on/off-switch the output of each of the detected currents IS1 and IS2 from the first and second current detectors 141 and 142 in response to an output signal from the abnormal state determiner 152.

The switching element of the switch 153 is composed of a MOS (Metal-Oxide Semiconductor) transistor Q having a gate connected to an output terminal of the abnormal state determiner 152, a drain connected to the common connection point of the output terminals of the first and second current detectors 141 and 142 and to an output terminal of the inverter abnormal state detector 150 which provides each of the detected currents IS1 and IS2 from the first and second current detectors 141 and 142 as the output current Iout, and a source connected to the ground.

Here, the reference character Vcc, not described, denotes a bias voltage.

A detailed description will hereinafter be given of the operation of the backlight inverter for the U-shaped lamp with the above-stated configuration according to the present invention with reference to the accompanying drawings.

With reference to FIGS. 2 and 3, the driver 110 provides the first and second transformer drive voltages to the first and second transformers 121 and 122 in response to the operation control signal, respectively.

The first transformer 121 boosts the first transformer drive voltage from the driver 110 in the turn ratio between the primary and secondary windings L11 and L21 thereof and supplies the resulting first drive voltage Vdr1 to one end of the U-shaped lamp UL, and the second transformer 122 boosts the second transformer drive voltage from the driver 110 in the turn ratio between the primary and secondary windings L12 and L22 thereof and supplies the resulting second drive voltage Vdr2 to the other end of the U-shaped lamp UL.

At this time, the U-shaped lamp UL is operated with the first drive voltage Vdr1 from the first transformer 121 and the second drive voltage Vdr2 from the second transformer 122. Here, the first and second drive voltages Vdr1 and Vdr2 have a phase difference of 180° therebetween and each of them has any value within the range of about 750 to 1000V with a frequency of about 40 to 70 kHz.

As stated previously, in the case where a conventional backlight inverter using one transformer is applied to drive the U-shaped lamp, there is a problem in that the withstand voltage of the transformer must rise to about twice that in the case of driving the linear lamp. For this reason, in order to stably drive the U-shaped lamp, it is preferable that two transformers are connected to both ends of the lamp, respectively, in such a manner that they have opposite phases to each other. Moreover, the output voltages from the two transformers have a phase difference of 180° therebetween, as stated above, so that they realize twice of one drive voltage to the U-shaped lamp.

On the other hand, the first voltage detector 131 detects the voltage VA across the secondary winding L21 of the first transformer 121, and the second voltage detector 132 detects the voltage VB across the secondary winding L22 of the second transformer 122.

In more detail, the first voltage detector 131 detects the voltage VA across the secondary winding L21 of the first transformer 121 at the connection point A of the two capacitors C11 and C12 connected in series between the high voltage terminal H1 of the secondary winding L21 and the ground terminal G1 thereof.

Here, the detected voltage in each of the normal and abnormal states of the inverter can be set by setting the capacitances of the two capacitors C11 and C12 to proper values. For example, the capacitance of C11, of the two capacitors C11 and C12, may be set to any value within the range of about 6.8 to 47 pF and the capacitance of C12 may be set to any value within the range of about 1 to 10 nF. In this case, the detected voltage may be about 1V in the normal state and about 10V in the abnormal state.

The second voltage detector 132 detects the voltage VB across the secondary winding L22 of the second transformer 122 at the connection point B of the two capacitors C21 and C22 connected in series between the high voltage terminal H2 of the secondary winding L22 and the ground terminal G2 thereof.

Here, similarly to in the first voltage detector 131, the detected voltage in each of the normal and abnormal states of the inverter can be set by setting the capacitances of the two capacitors C21 and C22 to proper values. For example, the capacitance of C21, of the two capacitors C21 and C22, may be set to any value within the range of about 6.8 to 47 pF and the capacitance of C22 may be set to any value within the range of about 1 to 10 nF. In this case, the detected voltage may be about 1V in the normal state and about 10V in the abnormal state.

On the other hand, in the backlight inverter of the present invention, when the line to the first transformer 121 is opened, the output voltage from the first transformer 121 becomes higher than the output voltage from the second transformer 122. When the line to the first transformer 121 is shorted to the ground, the output voltage from the first transformer 121 has a ground level and the output voltage from the second transformer 122 rises. When the lamp is normally operated, the voltages VA and VB detected by the first and second voltage detectors 131 and 132 are low in level, since the two drive voltages Vdr1 and Vdr2 are maintained as normal operating voltages.

However, in an abnormal state of the inverter such as an opened or shorted state of any one line, breaking of the lamp, arcing of the lamp resulting from incomplete soldering of any one transformer, or etc., the voltages VA and VB inputted to the inverter abnormal state detector 150 rise due to a voltage unbalance between the first and second transformers 121 and 122. In this regard, the abnormal state of the inverter can be detected using the voltage rising phenomenon resulting from the voltage unbalance, as will hereinafter be described.

The first current detector 141 detects the current IS1 flowing through the secondary winding L21 of the first transformer 121. That is, the first current detector 141 detects the current IS1 flowing through the secondary winding L21 of the first transformer 121 at the ground terminal G1 thereof through the resistor R1.

The second current detector 142 detects the current IS2 flowing through the secondary winding L22 of the second transformer 122. That is, the second current detector 142 detects the current IS2 flowing through the secondary winding L22 of the second transformer 122 at the ground terminal G2 thereof through the resistor R2.

The inverter abnormal state detector 150 detects an abnormal state of the inverter on the basis of each of the detected voltages VA and VB from the first and second voltage detectors 131 and 132. When the abnormal state of the inverter is detected, the inverter abnormal state detector 150 cuts off the output of each of the detected currents IS1 and IS2 from the first and second current detectors 141 and 142. However, if no abnormal state of the inverter is detected, the detector 150 provides each of the detected currents IS1 and IS2 from the first and second current detectors 141 and 142 as the output current Iout.

In more detail, in the inverter abnormal state detector 150, the rectifier 151 rectifies each of the detected voltages VA and VB from the first and second voltage detectors 131 and 132. That is, the rectifier 151 receives the detected voltage VA from the first voltage detector 131 through the first input resistor R11 and the detected voltage VB from the second voltage detector 132 through the second input resistor R12, respectively, rectifies each of the received voltages VA and VB through the rectification diode D and outputs the rectified voltage to the abnormal state determiner 152.

The abnormal state determiner 152 compares the output voltage VD from the rectifier 151 with the predetermined abnormal state determination voltage Vref to determine whether the inverter is in an abnormal state, and then outputs a voltage based on a result of the comparison to the switch 153. That is, the abnormal state determiner 152 receives the output voltage VD from the rectifier 151 through its non-inverting input terminal and the predetermined abnormal state determination voltage Vref through its inverting input terminal, respectively, compares the received voltages with each other and determines from a result of the comparison whether the inverter is in the abnormal state. When the voltage VD is higher than the abnormal state determination voltage Vref, the abnormal state determiner 152 determines the inverter to be in the abnormal state and then outputs a high voltage to the switch 153. On the contrary, when the voltage VD is not higher than the abnormal state determination voltage Vref, the abnormal state determiner 152 determines the inverter to be in the normal state and then outputs a low voltage to the switch 153.

In the abnormal state determiner 152, the abnormal state determination voltage Vref can be set to any value between the output voltage VD from the rectifier 151 in the normal state of the inverter and that in the abnormal state of the inverter. For example, if the voltage VD is 1V in the normal state and 10V in the abnormal state, the abnormal state determination voltage Vref may be set to 5V. In this case, if the voltage VD is higher than the abnormal state determination voltage Vref, 5V, the abnormal state determiner 152 determines the inverter to be in the abnormal state and then outputs a high voltage to the switch 153. On the contrary, if the voltage VD is not higher than the abnormal state determination voltage Vref, 5V, the abnormal state determiner 152 determines the inverter to be in the normal state and then outputs a low voltage to the switch 153.

The switch 153 switches the output of each of the detected currents IS1 and IS2 from the first and second current detectors 141 and 142 according to a result of the abnormal state determination by the abnormal state determiner 152. That is, the switch 153 is connected between the common connection point of the output terminals of the first and second current detectors 141 and 142 and the ground to on/off-switch the output of each of the detected currents IS1 and IS2 from the first and second current detectors 141 and 142 in response to the output signal from the abnormal state determiner 152.

For example, when the switch 153 receives the high voltage from the abnormal state determiner 152 at its gate, it is turned on to bypass each of the detected currents IS1 and IS2 from the first and second current detectors 141 and 142 to the ground so as to maintain the output current Iout at the ground level. As a result, the driver controller 160 provides the shutdown control signal to the driver 110. On the contrary, when the switch 153 receives the low voltage from the abnormal state determiner 152 at its gate, it is turned off to supply each of the detected currents IS1 and IS2 from the first and second current detectors 141 and 142 as the output current Iout to the driver controller 160 so as to control the normal operation of the driver 110.

At this time, upon receiving the output current Iout from the inverter abnormal state detector 150, the driver controller 160 provides the operation control signal to the driver 110 to control the normal operation thereof. However, if no current from the inverter abnormal state detector 150 is inputted, namely, if the output current Iout is low in level, the driver controller 160 provides the shutdown control signal to the driver 110.

As described above, according to the present invention, it is possible to detect an opened or shorted state of the backlight inverter circuit and/or lamp, breaking of the lamp, and arcing of the lamp by a high voltage due to a loosened state (incompletely soldered state), not a fully opened state, of a transformer, which may result in a fire in a set equipped with the inverter. Although the transformer can be, of course, completely soldered in a manufacturing process thereof, the soldering thereof may become incomplete due to a shock during transportation.

In an abnormal state of the backlight inverter such as an opened or shorted state of the inverter circuit and/or lamp, breaking of the lamp, or arcing of the lamp, the backlight inverter is shut down to output no drive voltage, so that it can be prevented from being damaged in the abnormal state.

As apparent from the above description, the present invention provides a backlight inverter for a U-shaped lamp which is capable of detecting an abnormal state of an inverter circuit, such as an opened or shorted state of the inverter circuit and/or lamp, breaking or arcing of the lamp, or etc., and shutting down the inverter circuit upon detecting the abnormal state thereof, so as to enhance operational reliability thereof. Therefore, it is possible to detect an opened or shorted state of the backlight inverter circuit and/or lamp, breaking of the lamp, arcing of the lamp resulting from a loosened state (incompletely soldered state) of a transformer, etc., thereby increasing reliability of the inverter at minimum material cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight inverter for a U-shaped lamp, comprising:
   a driver for supplying first and second transformer drive voltages in response to an operation control signal and cutting off the supply of the transformer drive voltages in response to a shutdown control signal;
   a first transformer for boosting the first transformer drive voltage from the driver in a turn ratio between primary and secondary windings thereof and supplying the resulting first drive voltage to one end of the U-shaped lamp;
   a second transformer for boosting the second transformer drive voltage from the driver in a turn ratio between primary and secondary windings thereof and supplying the resulting second drive voltage to the other end of the U-shaped lamp;
   first and second voltage detectors for detecting voltages across the secondary windings of the first and second transformers, respectively;
   first and second current detectors for detecting currents flowing through the secondary windings of the first and second transformers, respectively;
   an inverter abnormal state detector for detecting an abnormal state of the inverter on the basis of each of the detected voltages from the first and second voltage detectors, and cutting off output of each of the detected currents from the first and second current detectors upon detecting the abnormal state of the inverter and providing each of the detected currents from the first and second current detectors as output current upon detecting no abnormal state of the inverter; and
   a driver controller for providing the operation control signal to the driver to control a normal operation thereof, upon receiving the output current from the inverter abnormal state detector, and providing the shutdown control signal to the driver upon receiving no current from the inverter abnormal state detector.

2. The backlight inverter as set forth in claim 1, wherein the inverter abnormal state detector includes:
   a rectifier for rectifying each of the detected voltages from the first and second voltage detectors;
   an abnormal state determiner for comparing an output voltage from the rectifier with a predetermined abnormal state determination voltage to determine whether the inverter is in the abnormal state; and
   a switch for switching the output of each of the detected currents from the first and second current detectors according to a result of the abnormal state determination by the abnormal state determiner.

3. The backlight inverter as set forth in claim 1, wherein the first voltage detector includes two capacitors connected in series between a high voltage terminal of the secondary winding of the first transformer and a ground terminal thereof, the capacitors cooperating to detect the voltage across the secondary winding of the first transformer at a connection point thereof.

4. The backlight inverter as set forth in claim 1, wherein the second voltage detector includes two capacitors connected in series between a high voltage terminal of the secondary winding of the second transformer and a ground terminal thereof, the capacitors cooperating to detect the voltage across the secondary winding of the second transformer at a connection point thereof.

5. The backlight inverter as set forth in claim 1, wherein the first current detector includes a resistor connected between a ground terminal of the secondary winding of the first transformer and ground, the resistor detecting the current flowing through the secondary winding of the first transformer at the ground terminal thereof.

6. The backlight inverter as set forth in claim 1, wherein the second current detector includes a resistor connected between a ground terminal of the secondary winding of the second transformer and ground, the resistor detecting the current flowing through the secondary winding of the second transformer at the ground terminal thereof.

7. The backlight inverter as set forth in claim 2, wherein the rectifier includes:
   a first input resistor having one end connected to an output terminal of the first voltage detector;
   a second input resistor having one end connected to an output terminal of the second voltage detector; and
   a rectification diode having an anode connected in common to the other ends of the first and second input resistors and a cathode connected to an input terminal of the abnormal state determiner.

8. The backlight inverter as set forth in claim 2, wherein the abnormal state determination voltage in the abnormal state determiner is set to any value between the output voltage from the rectifier in a normal state of the inverter and that in the abnormal state of the inverter.

9. The backlight inverter as set forth in claim 2, wherein the abnormal state determiner includes a comparator having a non-inverting input terminal for receiving the output voltage from the rectifier, an inverting input terminal for receiving the predetermined abnormal state determination voltage, and an output terminal for outputting a high voltage if the output voltage from the rectifier is higher than the abnormal state determination voltage and a low voltage if it is not higher than the abnormal state determination voltage.

10. The backlight inverter as set forth in claim 2, wherein the switch includes a switching element connected between a common connection point of output terminals of the first and second current detectors and ground, the switching element on/off-switching the output of each of the detected currents from the first and second current detectors in response to an output signal from the abnormal state determiner.

11. The backlight inverter as set forth in claim 10, wherein the switching element includes a MOS (Metal-Oxide Semiconductor) transistor having a gate connected to an output terminal of the abnormal state determiner, a drain connected to the common connection point of the output terminals of the first and second current detectors and to an output terminal of the inverter abnormal state detector which provides each of the detected currents from the first and second current detectors as the output current, and a source connected to the ground.

* * * * *